United States Patent
Huang

(10) Patent No.: US 10,791,353 B2
(45) Date of Patent: Sep. 29, 2020

(54) SYSTEMS AND METHODS FOR CONTENT MANAGEMENT OF LIVE OR STREAMING BROADCASTS AND VIDEO PUBLISHING SYSTEMS

(71) Applicant: Ernest Huang, Campbell, CA (US)

(72) Inventor: Ernest Huang, Campbell, CA (US)

( * ) Notice: Subject to any disclaimer, the term of this patent is extended or adjusted under 35 U.S.C. 154(b) by 0 days.

(21) Appl. No.: 16/273,120

(22) Filed: Feb. 11, 2019

(65) Prior Publication Data

US 2019/0253744 A1     Aug. 15, 2019

Related U.S. Application Data

(60) Provisional application No. 62/629,701, filed on Feb. 13, 2018.

(51) Int. Cl.
| | |
|---|---|
| *H04N 7/16* | (2011.01) |
| *H04N 7/10* | (2006.01) |
| *H04N 7/025* | (2006.01) |
| *H04N 21/254* | (2011.01) |
| *H04N 21/2187* | (2011.01) |
| *H04N 21/454* | (2011.01) |
| *H04N 21/258* | (2011.01) |
| *H04N 21/25* | (2011.01) |
| *H04N 21/2343* | (2011.01) |
| *G06N 20/00* | (2019.01) |

(52) U.S. Cl.
CPC ......... *H04N 21/2541* (2013.01); *G06N 20/00* (2019.01); *H04N 21/2187* (2013.01); *H04N 21/234363* (2013.01); *H04N 21/251* (2013.01); *H04N 21/25883* (2013.01); *H04N 21/454* (2013.01)

(58) Field of Classification Search
CPC .......... H04N 21/2541; H04N 21/2187; H04N 21/234363; H04N 21/251; H04N 21/25883; H04N 21/454; G06N 20/00
See application file for complete search history.

(56) References Cited

U.S. PATENT DOCUMENTS

| | | | |
|---|---|---|---|
| 2003/0078972 A1* | 4/2003 | Tapissier | H04L 12/1822 709/204 |
| 2012/0078626 A1* | 3/2012 | Tsai | G10L 15/26 704/235 |

(Continued)

OTHER PUBLICATIONS

Julia Alexander, "YouTube specifies what type of gaming content could face demonetization", Jun. 5, 2017, Polygon, https://www.polygon.com/2017/6/5/15739414/youtube-gaming-ads, pp. 1-3.*

*Primary Examiner* — Kyu Chae

(57) ABSTRACT

Example implementations described herein are directed to systems, methods, and computer programs for the management of live or streaming broadcasts for policy violations, which can include buffering a live stream broadcast, processing the buffered live stream broadcast with one or more special purpose hardware processors configured with a machine learning algorithm for detecting a policy violation, and for the processing indicative of the policy violation existing in the buffered live stream broadcast, causing the buffered live stream broadcast to be modified. Such policy violations can include nudity, hate speech, copyright infringement, age inappropriate content and other violations in accordance with the desired implementation.

18 Claims, 8 Drawing Sheets

(56) References Cited

U.S. PATENT DOCUMENTS

| | | | |
|---|---|---|---|
| 2015/0143519 A1* | 5/2015 | Granstrom | G06F 21/10 |
| | | | 726/22 |
| 2016/0294894 A1* | 10/2016 | Miller | G06F 16/24578 |
| 2016/0350675 A1* | 12/2016 | Laks | G06Q 50/01 |
| 2017/0094351 A1* | 3/2017 | Gordon | H04N 21/23892 |
| 2017/0187986 A1* | 6/2017 | Zhang | H04N 21/2187 |
| 2017/0357782 A1* | 12/2017 | Leske | G06F 21/10 |
| 2018/0192101 A1* | 7/2018 | Bilobrov | G06F 21/10 |
| 2018/0276807 A1* | 9/2018 | Kish | G06T 7/0002 |
| 2018/0343492 A1* | 11/2018 | Konig | H04N 21/43615 |
| 2019/0005332 A1* | 1/2019 | Paluri | G06K 9/00744 |

* cited by examiner

| User ID | Policy Strike | Corroborating Evidence | Appeal Result |
|---|---|---|---|
| User 1 | Copyright violation | Video 2 | Upheld |
| User 2 | Nudity | IMG2, IMG3 | Upheld |
| User 3 | Age inappropriate | Video 3, Video 6 | Withdrawn |
| User 4 | Hate Speech | Video 1, Video 2 | Upheld |
| ..... | ..... | ..... | |

FIG. 8

SYSTEMS AND METHODS FOR CONTENT MANAGEMENT OF LIVE OR STREAMING BROADCASTS AND VIDEO PUBLISHING SYSTEMS

CROSS REFERENCE TO RELATED APPLICATION

This U.S. patent application is based on and claims the benefit of domestic priority under 35 U.S.C 119(e) from provisional U.S. patent application No. 62/629,701, filed on Feb. 13, 2018, the disclosure of which is hereby incorporated by reference herein in its entirety.

BACKGROUND

Field

The present disclosure is directed generally to live or streaming broadcasts, and more specifically, for content management for live and streaming broadcasts and video publishing systems.

Related Art

As infrastructure improves, bandwidth for live or streaming broadcasting (e.g., video, audio, text chats, etc.) has grown exponentially. In particular, video/audio streaming to client devices such as televisions, laptops, user equipment (UE) and other devices has grown exponentially, which has spurred the growth of individual users and independent broadcasters to stream video or audio.

In related art implementations, a broadcaster can utilize streaming software to stream video, audio, and/or text chats to other users. In one example related art implementation, a web-based streaming service is provided whereupon a broadcaster can broadcast video, audio, and/or text chats to a server associated with the web based streaming service, and the web based streaming services transmits the received streaming content to other client devices.

Due to the rapid growth of broadcasting services, there has been a greater need to monitor content for legal compliance to prevent illicit content from being broadcasted. Related art implementations address the issue with human moderators who participate in the stream viewing with the audience and is granted administrative power to terminate a broadcast based on the content. Such human moderators may view the content along with the audience and upon viewing inappropriate or other policy violating or illicit content, may terminate the broadcast and suspend or ban the broadcaster from using the broadcasting services.

In related art television implementations, human moderators may be given a few second window (e.g. 3-5 seconds) before an automatic content transmission to terminate a broadcast having inappropriate or other policy violating content. In an example scenario, should a person commit suicide on a live broadcast, the human moderators may terminate the broadcast before the content is transmitted to outside devices.

There are several issues with implementing human moderators for content management of live or streaming broadcasts. For web streaming services or cloud based streaming services of content, the number of streaming broadcasts conducted by users may be overly large at any given time (e.g. tens or hundreds of thousands of simultaneous broadcasts), that it may be infeasible to have adequate numbers of human moderators to monitor the content of the broadcasts. Further, such broadcasts may occur at any time (e.g., a web streaming service or broadcast station that is accessible worldwide can have users broadcasting at any time of the day), thereby requiring continuous monitoring at all times by human moderators which may also be infeasible.

Use of human moderators has also been problematic in the related art implementations due to high turnover of such moderators. Because the human moderators may be subjected to illicit or inappropriate or other policy violating content (e.g., suicides, snuff films, child pornography, etc.), many human moderators thereby suffer disproportionate psychological damage, causing them to cease their role as a moderator. Due to the high turnover rate, such streaming services are forced to find new people to perform moderator duties, which cost time and resources from hiring and training, and churning from the constant cycle of losing and replacing human moderators.

In the related art, there are solutions for stopping broadcasts based on the detection of copyrighted content. In such related art implementations, the broadcast is compared to a database of copyrighted content, whereupon the related art implementations automatically stop the broadcast upon detection of the copyrighted content. However, such related art implementations are unintelligent in nature and generate many false positives. Further, even if the broadcaster may have rights to the copyrighted content or is using the content for fair use purposes, the related art implementations will stop the broadcast without taking such factors into consideration.

Similar problems also occur in video publishing systems in which a video may be flagged for violation of policy or for demonetization, therefore removing the video from being searchable or viewable, only to later determine that the flagging was incorrect. However, since such a video was disabled or rendered unsearchable during the time it took for a moderator to review, the content creator may lose views that would not have occurred had the review been conducted in a faster manner. Such problems can cause improperly flagged videos to be unviewable, even though no policy violation has occurred.

SUMMARY

Aspects of the present disclosure can include a method for detecting policy violations in a live stream broadcast, which can involve buffering a live stream broadcast in a cloud system; processing, in the cloud system, the buffered live stream broadcast with one or more special purpose hardware processors configured with a machine learning algorithm for detecting a policy violation; and for the processing indicative of the policy violation existing in the buffered live stream broadcast, causing the buffered live stream broadcast to be modified.

Aspects of the present disclosure can include a computer program for detecting policy violations in a live stream broadcast, which can involve instructions for processing the buffered live stream broadcast for detecting a policy violation; and for the processing indicating of the policy violation existing in the buffered live stream broadcast, means for causing the buffered live stream broadcast to be modified. The computer program can be stored on a non-transitory computer readable medium to be executed by one or more general purpose processors or special purpose hardware processors as described herein.

Aspects of the present disclosure can include a system for detecting policy violations in a live stream broadcast, which can involve means for buffering a live stream broadcast;

means for processing the buffered live stream broadcast for detecting a policy violation; and for the processing means indicating of the policy violation existing in the video content, means for causing the buffered live stream broadcast to be modified.

Aspects of the present disclosure can include a method for detecting policy violations in a video publishing system, which can involve receiving a video content for publishing; processing the video content for detecting a policy violation; and for the processing indicative of the policy violation existing in the video content, causing the video content to be modified before publication on the video publishing system.

Aspects of the present disclosure can include a computer program for detecting policy violations in a video publishing system, which can involve instructions for receiving a video content for publishing; processing the video content for detecting a policy violation; and for the processing indicative of the policy violation existing in the video content, causing the video content to be modified before publication on the video publishing system. The computer program can be stored on a non-transitory computer readable medium to be executed by one or more general purpose processors or special purpose hardware processors as described herein.

Aspects of the present disclosure can include a system for detecting policy violations in a video publishing system, which can involve means for receiving a video content for publishing; means for processing the video content for detecting a policy violation; and for the processing means indicating of the policy violation existing in the buffered live stream broadcast, means for causing the video content to be modified before publication on the video publishing system.

BRIEF DESCRIPTION OF THE DRAWINGS

FIG. 8 illustrates an example database of violations, in accordance with an example implementation.

DETAILED DESCRIPTION OF THE DRAWINGS

Figure 1:
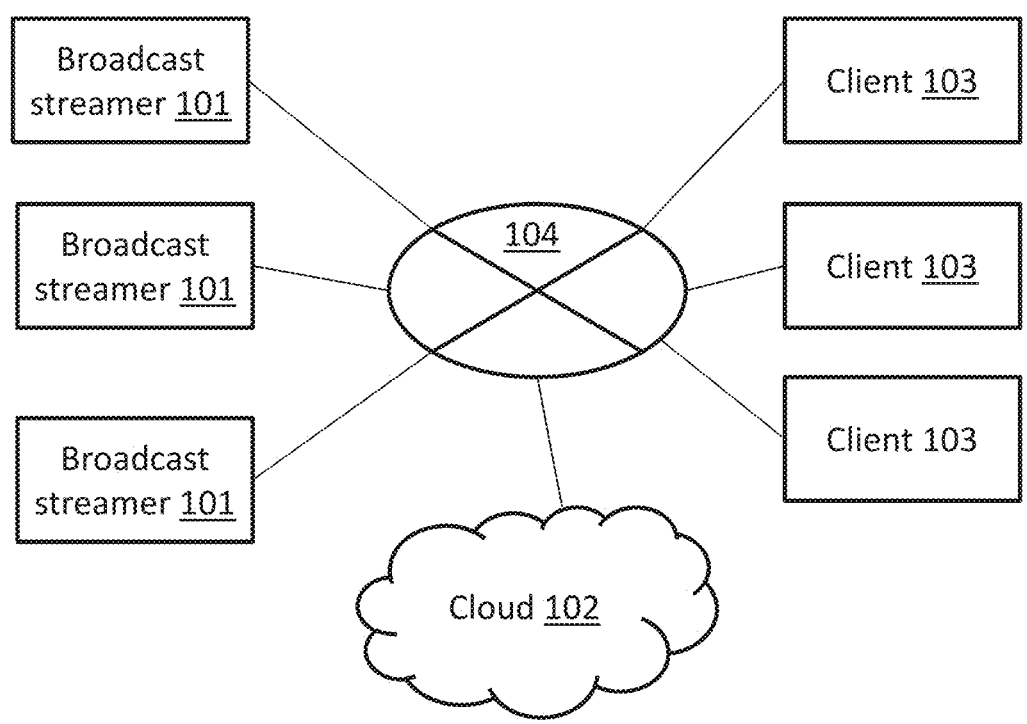
FIG. 1 illustrates an example system upon which the example implementations described herein can be implemented.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. The terms enhanced node B (eNodeB), small cell (SC), base station (BS) and pico cell may be utilized interchangeably throughout the example implementations. The implementations described herein are also not intended to be limiting, and can be implemented in various ways, depending on the desired implementation. Further, the example implementations described herein can be conducted in singular or in any combination with each other to facilitate the desired implementation, and the present disclosure is not limited to any particular one of the example implementations described herein.

Example implementations described herein address the aforementioned problems by providing a data analytics system to automatically process streamed content from a broadcaster for inappropriate or other policy violating content before broadcasting the content to the client devices. To maintain the live or streaming aspect of the broadcast, example implementations take advantage of the related art implementations use of buffering and latency to broadcast live or streaming content to client devices. In general, users of client devices prefer throughput and quality of the received broadcast compared to having the content being received live, and are willing to tolerate a delay (e.g., 30 second delay, one minute delay, etc.) so that content can buffer before being received by the client device. Example implementations take advantage of this toleration of a delay to add an additional buffering layer to process streamed or live broadcasts for inappropriate or other policy violating content. This provides for seamless streaming and maintenance of throughput despite having background processing for policy violations on the stream broadcast, in exchange for a somewhat longer delay difference between what is broadcasted live versus what is actually broadcasted to the client devices.

In an example implementation, the stream broadcast can be sent to client devices even if inappropriate or other policy violating content is detected on the stream content. In such example implementations, the broadcast stream can be deprecated (e.g., frames or audio removed, reduction in frame/audio quality, frames or audio replaced with an advertisement or other content such as a loading or buffering screen, etc.), so that for situations where the inappropriate or other policy violating content is only temporary in nature, the broadcast can continue to the client devices, thereby avoiding the problem of related art implementations of terminating broadcasts based on false positives. In such example implementations, should the inappropriate or other policy violating content continue for a period of time beyond a threshold, the broadcast can be terminated, or flagged for a human moderator for review.

In an example implementation, machine learning algorithms, such as artificial neural networks, decision tree learning, association rule learning, support vector machines, or any other machine learning algorithm can be applied for determining if the content is inappropriate or other policy violating. By applying machine learning algorithms, even if false positives occur, such false positives can be reduced over time as the system receives additional training over time. Because stream broadcast providers can provide many instances to train the machine learning algorithms (e.g., tens of thousands or more a day), the system can obtain enough samples to provide a solution that can exceed a human moderator while avoiding the burnout and problems of psychological damage associated with human moderators.

In an example implementation, feedback training can be provided based on inputs from the client devices. For example, client devices may flag content as being inappropriate or for other policy violations which can be used by machine learning algorithms to reduce the number of false negatives of the system. False positives may also be learned by the system through the submissions of complaints or through other inputs from the client devices, in accordance with an example implementation.

In an example implementation, the inappropriate or other policy violating content is deprecated, skipped, altered, or replaced, thereby allowing the transmission to continue if the inappropriate or other policy violating content was only temporary in nature. Such deprecations can be hidden to the user of the client devices by reducing the video/audio quality of the inappropriate or other policy violating content, by replacing the content with an advertisement or a loading screen, by doing frame and audio skips to simulate lag in the broadcast, removing the broadcast video from being searchable in the search interface, demonetizing the broadcast stream, or through other methods depending on the desired implementation.

In an example implementation, one or more different databases of inappropriate or other policy violating content can be used to pre-train the machine learning algorithms. Such databases can include examples of nudity, copyrighted content, inappropriate or other policy violating content, such as violent content, illicit content, pornography, or any other type of content considered to be inappropriate or in violation of the broadcast policy. Databases can also include examples of appropriate content (e.g., for a genre, for a specific age restricted broadcasting group, etc.) to train the machine learning algorithms as well, depending on the desired implementation.

FIG. 1 illustrates an example system upon which the example implementations described herein can be implemented. In an example system, there are one or more stream broadcasters 101 that transmit a stream broadcast to a cloud 102. The cloud 102 may involve one or more servers and storage systems configured to receive a stream broadcast from a cloud 102 and buffer the content for one or more client devices 103. Client devices 103 may also buffer content locally before providing the stream broadcast to the user of the client devices 103. The stream broadcasters 101, cloud 102, and client devices 103 are interconnected by a network 104. The network 104 can be a wireless or a wired connection and can be facilitated as a local area network (LAN) or over the internet. Each of the stream broadcasters 101 may be configured to transmit to the cloud 102 through network 104 at any given time. Client devices 103 may access broadcasted content from the processed live broadcasts of cloud 102 through network 104.

Figure 2:
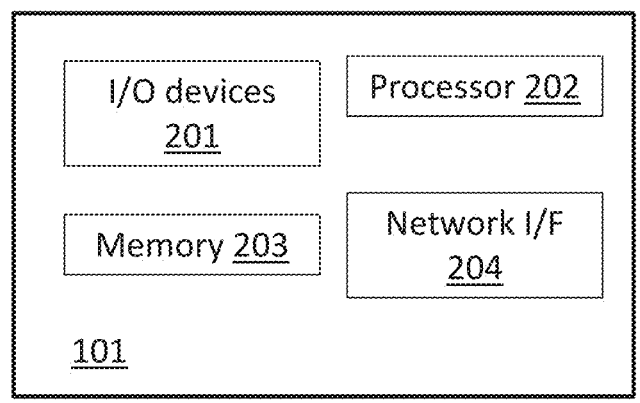
FIG. 2 illustrates an example stream broadcasting system, in accordance with an example implementation.

FIG. 2 illustrates an example stream broadcasting system, in accordance with an example implementation. Stream broadcasting system 101 can be in the form of any user device for broadcasting live stream content to the cloud 102, such as a laptop, a Personal Computer (PC), a smartphone, tablet, or any other device capable of generating and sending stream content to cloud 102. Stream broadcasting system 101 can involve, but is not limited to, one or more input/output (I/O) devices 201, Central Processing Unit (CPU) 202, Memory 203, and Network Interface 204. The one or more I/O devices can include any devices utilized for live broadcast streaming, such as a video camera, keyboard, microphone, display device, and sensors according to the desired implementation (e.g., infrared cameras, accelerometers, touch screens, sensors for devices attached to the user, and so on). CPU 202 can be made of one or more physical processors configured to process instructions for the stream broadcasting system 101. Memory 203 can be configured to store instructions for loading into processors 202 for executing a process. Network Interface 204 can be configured to stream live broadcasts to cloud 102 through interfacing with network 104.

Figure 3:
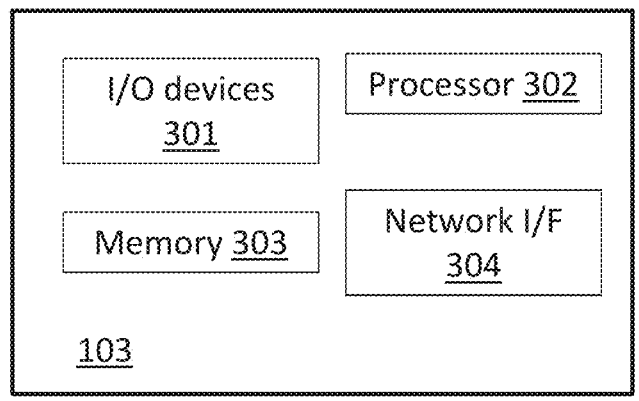
FIG. 3 illustrates an example client device, in accordance with an example implementation.

FIG. 3 illustrates an example client device, in accordance with an example implementation. Client device 103 can be in the form of any user device for processing and receiving live stream content to the cloud 102, such as a laptop, a Personal Computer (PC), a smartphone, tablet, or any other device capable of receiving processed live broadcast content from cloud 102 and displaying it to a user. Client device 103 can involve, but is not limited to, one or more input/output (I/O) devices 301, Central Processing Unit (CPU) 302, Memory 303, and Network Interface 304. The one or more I/O devices can include any devices utilized for receiving processed live broadcasts and/or sending feedback to cloud 102, such as a video camera, keyboard, microphone, display device, and sensors according to the desired implementation (e.g., infrared cameras, accelerometers, touch screens, sensors for devices attached to the user, and so on). CPU 302 can be made of one or more physical processors configured to process and provide live broadcasts from cloud 102. Memory 303 can be configured to store instructions for loading into processors 302 for executing a process, as well as for buffering the live stream broadcast for presentation to the user. Network Interface 304 can be configured to receive live broadcasts from cloud 102 through interfacing with network 104.

Figure 4:
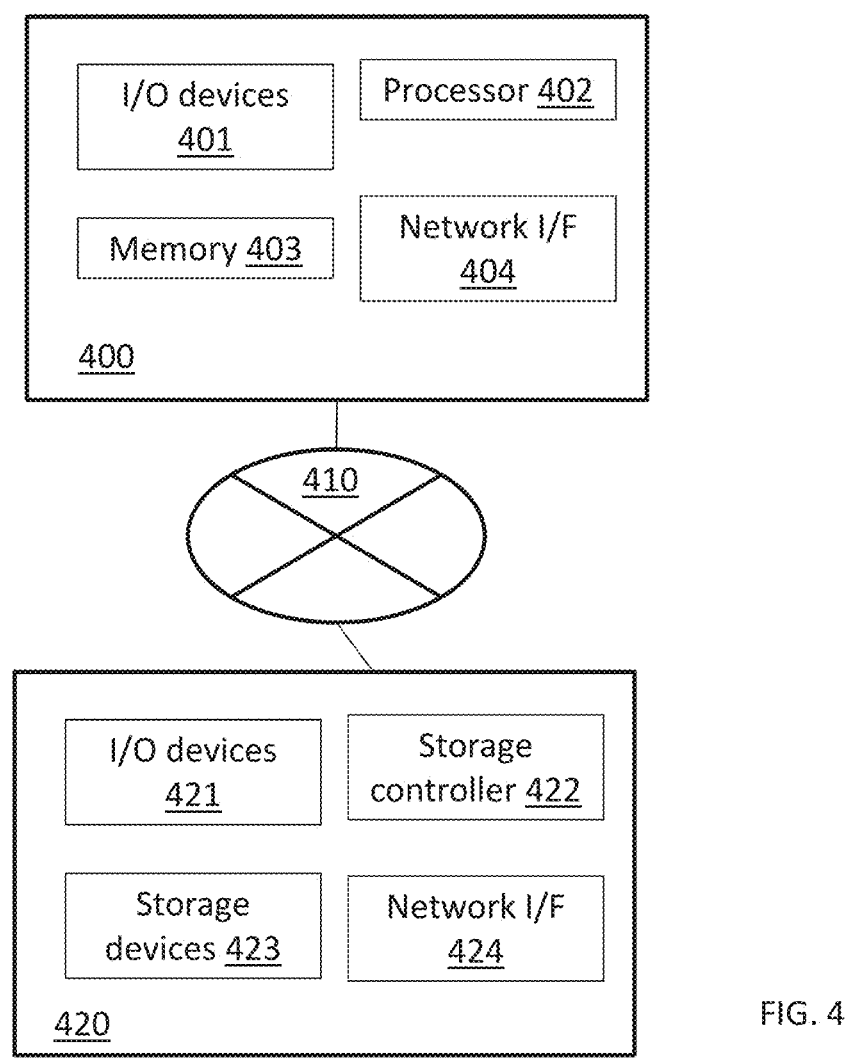
FIG. 4 illustrates an example server for a cloud, in accordance with an example implementation.

FIG. 4 illustrates an example server for a cloud 102, in accordance with an example implementation. Cloud 102 may be composed of one or more servers 400 that manage one or more storage systems 420 through one or more internal networks 410. Internal networks 410 can be networks such as Storage Area Network (SAN), Wide Area Networks (WAN) or other networks depending on the desired implementation.

Each of the one or more servers 400 can include I/O devices 401, processors 402 which can take the form of one or more physical processors such as CPUs or otherwise as described herein, memory 403, and Network Interface 404. Memory 403 may include cache memory that takes in live broadcast streaming data from stream broadcasting systems for processing in real time, and other non-transitory memory for loading instructions into processors 402 for executing the algorithms for server 400. In an example implementation, memory 403 may be in the form of flash memory such as solid state devices (SSD), but other implementations such as hard disk drive (HDD) or redundant array of inexpensive disks (RAID) may be utilized, according to the desired implementation. Servers 400 may also interact with one or more storage systems 420, each of which can include I/O devices 421, storage controller 422 which can take the form of one or more physical processors, storage devices 423, and Network Interface 424. In example implementations, data from stream broadcast systems that are transmitted and managed in memory 403 may be destaged to the one or more storage systems 420 to be used in the database for machine learning algorithms.

The one or more storage systems 420 can be configured as a pool to serve as a database for the machine learning algorithms. Storage controller 422 is configured to manage the data in the storage system 420 by providing data from storage devices 423 for use in a pool or for use in logical volumes.

Depending on the desired implementation, processors 402 are in the form of one or more general purpose computing on graphical processing units (GPGPUs), tensor units, streaming processors, or any other kind of special purpose hardware processor configured specifically to execute machine learning algorithm processing on data in accordance with the example implementations. Such special purpose hardware processors may also be arranged in clusters to facilitate the needed processing power for the machine learning algorithms to meet the latency or real-time requirements of the example implementations described herein. In such example implementations, utilizing special purpose hardware configured to execute the particular machine learning algorithms of the example implementations can assist in ensuring that the processing can be completed and the appropriate broadcast stream can be provided to client devices within the desired time frame. Although CPUs can be utilized in this example implementation, CPUs may not have the processing power or specialization capability that special machine learning hardware or streaming processors have to process the stream broadcast, modify the stream broadcast as needed, and broadcast to the client devices within the desired time frame.

As described herein, cloud system 102 can be configured to buffer a live stream broadcast from a stream broadcaster 101, and conduct processing through the use of processors 402 configured with a machine learning algorithm for detecting a policy violation. If the processing is indicative of a policy violation, then the buffered live stream broadcast can be modified, either by dropping frames, reducing the throughput or resolution of the stream or other methods. Depending on the desired implementation the buffered live stream broadcast does not need to be modified, but rather the account for the stream can be flagged instead, or the stream can be disconnected. Depending on the desired implementation, the processing of the buffered live stream broadcast with the processors 402 can be conducted in response to a number of content flagging from client devices exceeding a threshold.

As described herein, the buffering the live stream can be conducted on flash memory configured to function as cache 403 for the cloud system 102, wherein the processing is conducted on the buffered live stream on the flash memory 403.

As described herein, cloud system 102 can be configured to cause the buffered live stream broadcast to be modified by conducting at least one of transmitting the buffered live stream broadcast at a lower resolution, and/or instructing client devices receiving the buffered live stream broadcast to display the buffered live stream at the lower resolution. Other examples for causing the buffered live stream broadcast to be modified can include causing client devices to display a buffering or loading indicator, causing client devices to disconnect from the live stream broadcast, causing client devices to reduce the resolution of the buffered live stream broadcast, and so on depending on the desired implementation. Such implementations may also be incorporated with other implementations for flagging the stream broadcast for manual review if necessary.

Depending on the desired implementation, the processing of the buffered live stream broadcast with the processors 402 can involve processing a chat log associated with the buffered live stream broadcast; wherein the processing is determined to be indicative of the policy violation existing in the buffered live stream broadcast based on content in the buffered live stream broadcast and the chat log as described herein.

Depending on the desired implementation, when the causing the buffered live stream broadcast to be modified exceeds a threshold period of time, cloud system 102 can be configured to end the processing on the buffered live stream; transmit the buffered live stream without modification to client devices; and flag the buffered live stream for review.

Depending on the desired implementations, when a number of policy violations of a stream broadcasting account associated with the live stream broadcast exceeding a threshold, the cloud system 102 can be configured to disconnect the live stream broadcast and conduct at least one of flagging the stream broadcasting account for review; and suspending the stream broadcasting account from broadcasting live stream broadcasts.

In example implementations described herein, the machine learning algorithm can be trained from a database of content considered to be a policy violation based on the type of policy violation. For example, the policy violation can involve age inappropriate content, wherein the machine learning algorithm is trained from a database of age inappropriate content. In another example, the policy violation can involve nudity, wherein the machine learning algorithm is trained from a database of nudity. The policy violation can also involve a hate speech violation, wherein the machine learning algorithm is trained from a database of hate speech violations. In example implementations, multiple policy violation databases can be utilized if they are flagged by human moderators before. For example, the machine learning algorithm can be trained against a database of content flagged for one or more types of policy violations.

In example implementations, the cloud system 102 can be configured to cause the live stream broadcast to be modified by demonetizing the live stream broadcast. In that manner, the content creator of the live stream broadcast will not receive any payment for views or advertisements during at least a portion of the time the live stream broadcast is in effect. The cloud system 102 can also be configured to cause the live stream broadcast to be modified by restricting user access to the live stream broadcast. For example, cloud system 102 can allow the current viewers watching the live stream broadcast to continue viewing the live stream broadcast, but disables any new users from accessing the live stream broadcast. Or in another example implementation, cloud system 102 can restrict access to the live stream broadcast based on the desired restriction (e.g., age, geographic region, etc.), and can disconnect current viewers based on the desired restriction as well as allowing the live stream broadcast to be accessible based on the desired restriction. In another example implementation cloud system 102 can cause the live stream broadcast to be modified comprises changing searchability of the live stream broadcast. This can include de-emphasizing the live stream broadcast from the front page of the interface for accessing the live stream, by reducing the search score of the live stream broadcast so that it does not appear on the top or first few pages of the search results, removing searchability of the stream altogether from the interface, or through any other methods in accordance with the desired implementation.

Figure 5:
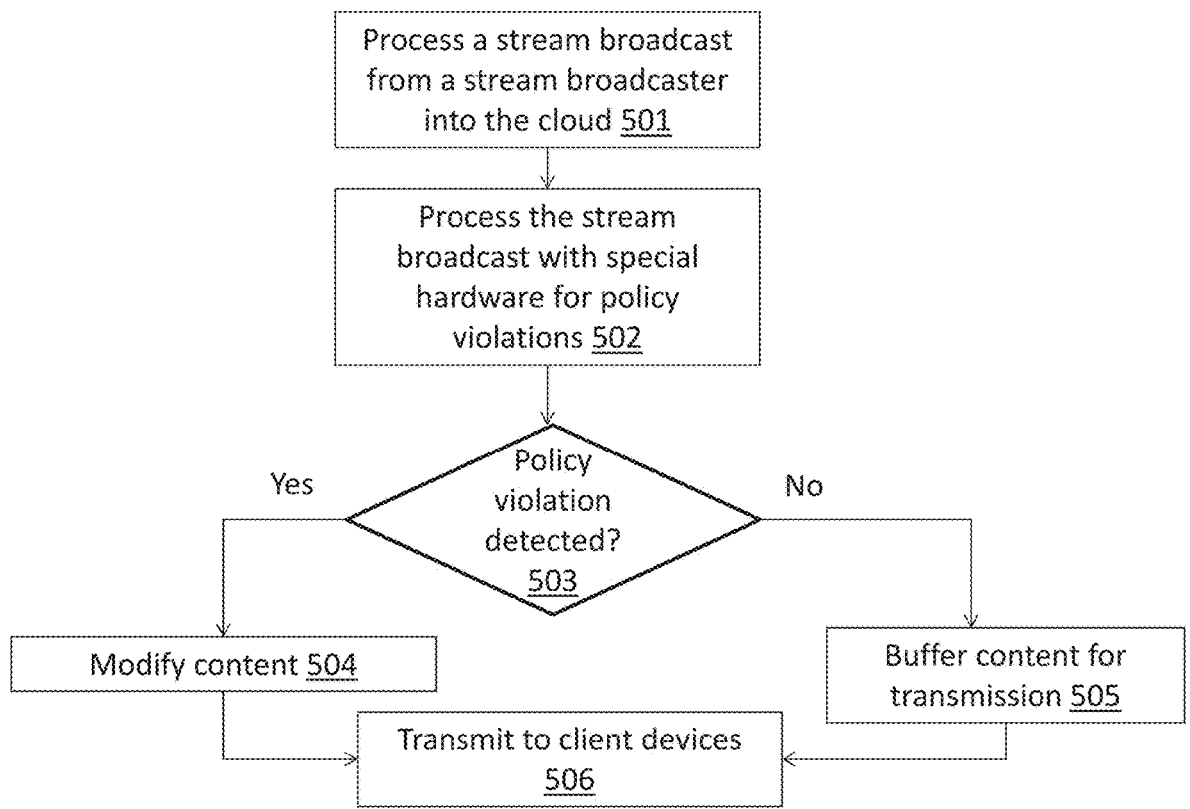
FIG. 5 illustrates an overall flow diagram in accordance with an example implementation.

FIG. 5 illustrates an overall flow diagram 500 in accordance with an example implementation. The example flow diagram 500 of FIG. 5 illustrates a flow for the cloud 102. At 501, the cloud 102 receives a stream broadcast from a broadcasting system and stores the stream broadcast into memory. In an example implementation, the stream broadcast is received by a server and stored into cache memory for in-memory processing, however, other implementations are also possible depending on the desired implementation. For example, the servers and memories of the cloud 102 can be used in a pool and represented logically, whereupon the stream broadcast is distributed across multiple memories or multiple servers. Further, multiple cloud networks may also be employed to handle stream broadcasts across various geographical locations, depending on the desired implementation.

At 502, the stream broadcast is processed in the cache memory for inappropriate or other policy violating content. In an example implementation, machine learning algorithms are used to process the stream broadcast in memory to determine the occurrence of inappropriate or other policy violating content. In an example implementation, a batch or a sliding window may be used to take samples of the stream broadcast for processing, however, other implementations are also possible in accordance with the desired implementation. For example, the cache memory may be allowed to buffer sufficient broadcasting content (e.g., 10 seconds of video, and/or 20 seconds of audio, chat stream, etc.), whereupon analysis is conducted on the buffered content and then released to the client after processing. The processing can be conducted by CPUs, or by special purpose hardware processors for facilitating the particular machine learning algorithm implementations. In an example implementation involving special purpose hardware processors, the snapshot of the stream broadcast is processed by the special purpose hardware processors (i.e. first ten frames, first ten seconds, etc. according to the desired implementation). The snapshot can be set based on the machine learning algorithm utilized as encoded into the special purpose hardware processors, can be set based upon a desired threshold of inappropriate content (e.g., number of frames, audio samples, etc.), or through other methods in accordance with the desired implementation.

At 503, processing is conducted to determine if inappropriate or other policy violating content is detected. The processing can be done by machine learning algorithms. Examples of such machine learning algorithms can include artificial neural networks (ANN), support vector machines, Bayesian networks, instance based learning, Q-learning and so on, according to the desired implementation. The machine learning algorithms may do comparisons based on examples made in storage systems 420, which can be stored in a hash form or in a neural network form for reference and comparison.

Figure 6A:
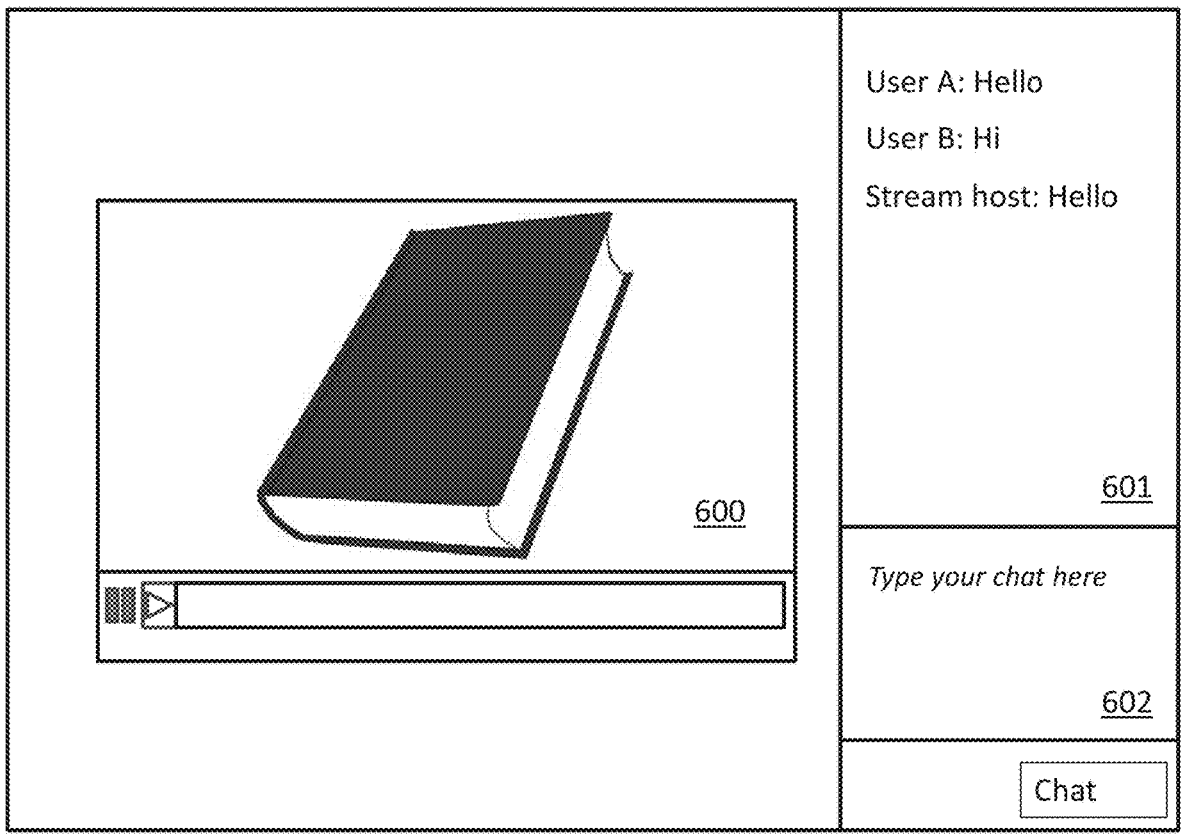
FIGS. 6A and 6B illustrate example screenshots, in accordance with an example implementation.
Figure 6B:
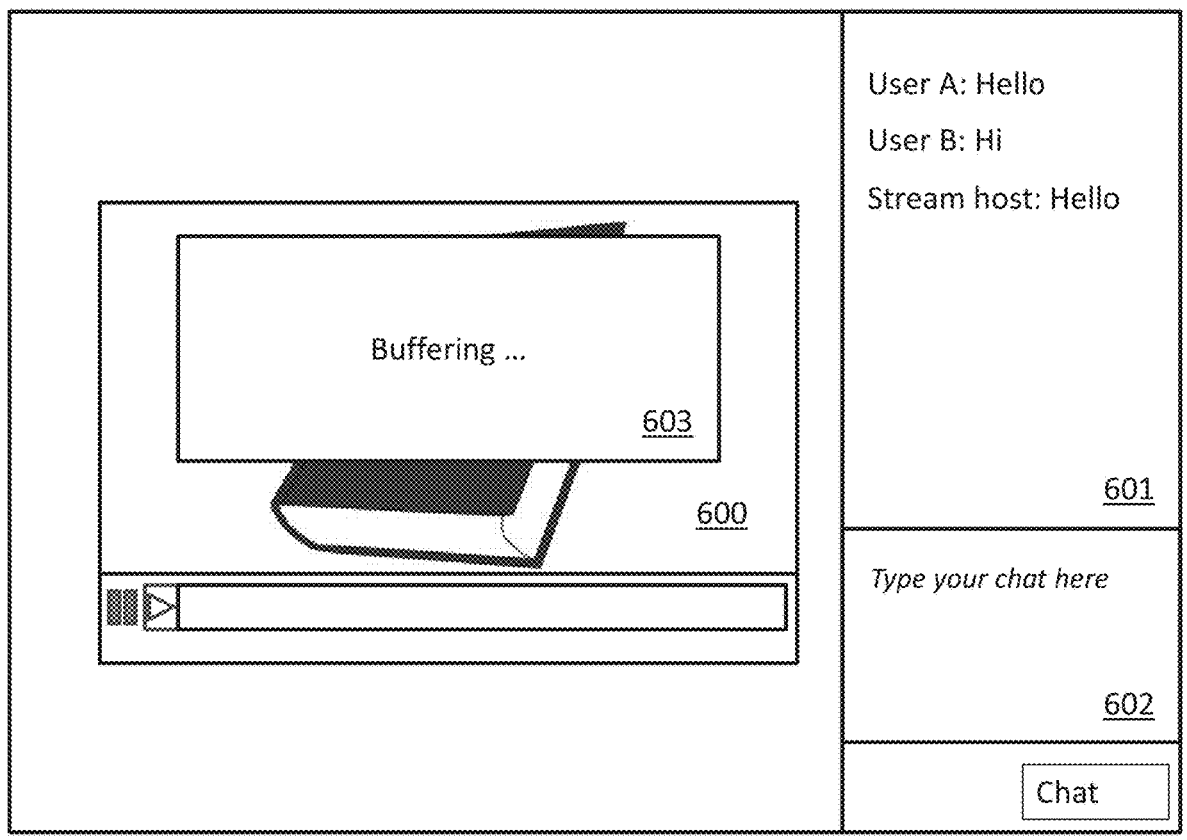

If inappropriate or other policy violating content is detected (Yes), then the flow proceeds to 504 to degrade or modify the content to be sent to the client devices as illustrated in FIGS. 6A and 6B, or provide instructions to client devices, or score or flag the stream broadcast. The example implementations take advantage of the expected latency between stream broadcasters and receipt at client devices (e.g., 30 seconds delay, one minute delay, etc.) due to the desire to have throughput.

Otherwise (No), then the flow proceeds to 505 to buffer the content to forward to the client devices. At 506, the content and/or the instructions are transmitted to the client devices.

FIGS. 6A and 6B illustrate example screenshots, in accordance with an example implementation. FIG. 6A illustrates an example screenshot layout of an example implementation. The display screen of a client device and/or the stream broadcasting system can display a video stream 600, a chat stream 601, and a chat input box 602. The video stream 600 is configured to display live stream broadcasting content processed by the cloud 102. The chat stream 601 can display chat input processed by the cloud 102 as provided by the client devices and the stream broadcasting system. The chat input box 602 is configured to receive input from the client device and/or the stream broadcasting system to provide to the chat stream 601.

In the example of FIG. 6B, due to inappropriate or other policy violating content being broadcasted by the content provider, the stream is deprecated to remove the inappropriate or other policy violating content. In this example implementation, a loading/buffering indicator 603 is provided to indicate that the stream is loading or buffering as a method to deprecate the stream broadcast. The loading marker can be utilized in replacement of the inappropriate or other policy violating content of the stream, until the machine learning algorithms determine that the content is no longer in violation of some policy, whereupon the stream resumes starting at the point where policy violating content is no longer being broadcasted. In such an implementation, the stream broadcast is paused with a loading or buffering indicator at the client devices until the content is no longer in violation of policy, whereupon the indicator is removed and the stream broadcast is resumed. Additional implementations can include the loading of an advertisement to replace the content that is determined to be modified until the content is no longer in violation of the policy, or through other desired methods to interrupt the content.

As a consideration for saving processing power, in example implementations, the flow at 504 for modifying content can be conducted by transmitting instructions to the client devices upon detection of content that is in violation of policy instead of transmitting modified frames. In such an example implementation, the cloud can transmit the stream broadcast to the client devices with instructions to degrade the resolution of the received stream broadcast, generate a loading or buffering indicator as illustrated in FIG. 6B, or even delete, discolor or otherwise modify the frames that are received in accordance with the desired implementation. The client devices can also be configured to reduce the resolution of the audio as well, in accordance with the desired implementation, or halt the stream broadcast by disconnecting from the broadcast. Any desired implementation for the client devices to respond in response to instructions from the cloud server regarding the detection of policy violating content can be done in accordance with the desired implementation.

Further, the example provided in FIG. 6B is not intended to be limiting, and other implementations are also possible depending on the desired implementation. For example, the stream broadcast resolution can be blurred or reduced drastically, and/or the audio quality may also be reduced so that from the client device perspective, it appears that lag has occurred and algorithms have reduced the resolution in exchange for throughput. The audio/visual resolution can be restored after the machine learning algorithms determine that the stream broadcast is no longer in violation of policy.

In another example, should the machine learning algorithms determine that only a part of the stream broadcast video is in violation of policy (e.g., background picture has a swastika or nudity), the portion of the stream broadcast video can be removed, cropped, or pixelated depending on the desired implementation. Such an example implementation can be accomplished through recognition of such symbols or clusters of pixels as being policy violating content, as further described with respect to FIG. 8.

Further, if the content is in violation for longer than a threshold period of time (e.g., 5 seconds either continuously or cumulative), the stream broadcast can be disconnected or flagged for a human moderator to review. In the latter case, the stream can be restored to normal while a human moderator is summoned to review the stream. The human moderator can then determine the appropriate course of action for the stream.

In additional implementations, the modification to the stream broadcast video can be conducted on the client side based on instructions provided by the cloud system. The cloud system can instruct the client devices to modify the displayed video based on the received instructions using the same examples above. For example, the instructions can instruct the application of the client device to provide a fake loading or buffering indicator. Additional s15 implementations can include having the client device access and load an advertisement to replace the content that is determined to be modified based on the instruction, or through other methods to interrupt the content.

In additional implementations, the modification of stream broadcast video does not need to occur if there are enough human moderators to review the broadcast videos when flagged. In such an example implementation, the special purpose hardware processors allow the stream broadcast to proceed normally, whereupon a human moderator is flagged to review the stream broadcast based on the content determined to be in violation of policy. The human moderator can then affirm or deny the violation and either cause the stream broadcast to disconnect or be modified depending on the desired implementation.

In additional implementations, the modification of stream broadcast video does not need to occur if the desired implementation is to simply terminate the broadcast stream or prevent additional users from accessing the stream. In such an example implementation, based on some triggering condition detected from the special purpose hardware (e.g., a score beyond a second threshold, certain keywords or content detected, etc.), the stream can either be automatically terminated, or the stream can be restricted so that additional users cannot access the live stream. In additional implementations, the stream can also be rendered unsearchable or be demoted in the search results so that users may not be able find the particular stream, and/or the stream can be demonetized (e.g., no payments made from advertisers), depending on the desired implementation.

Figure 7:
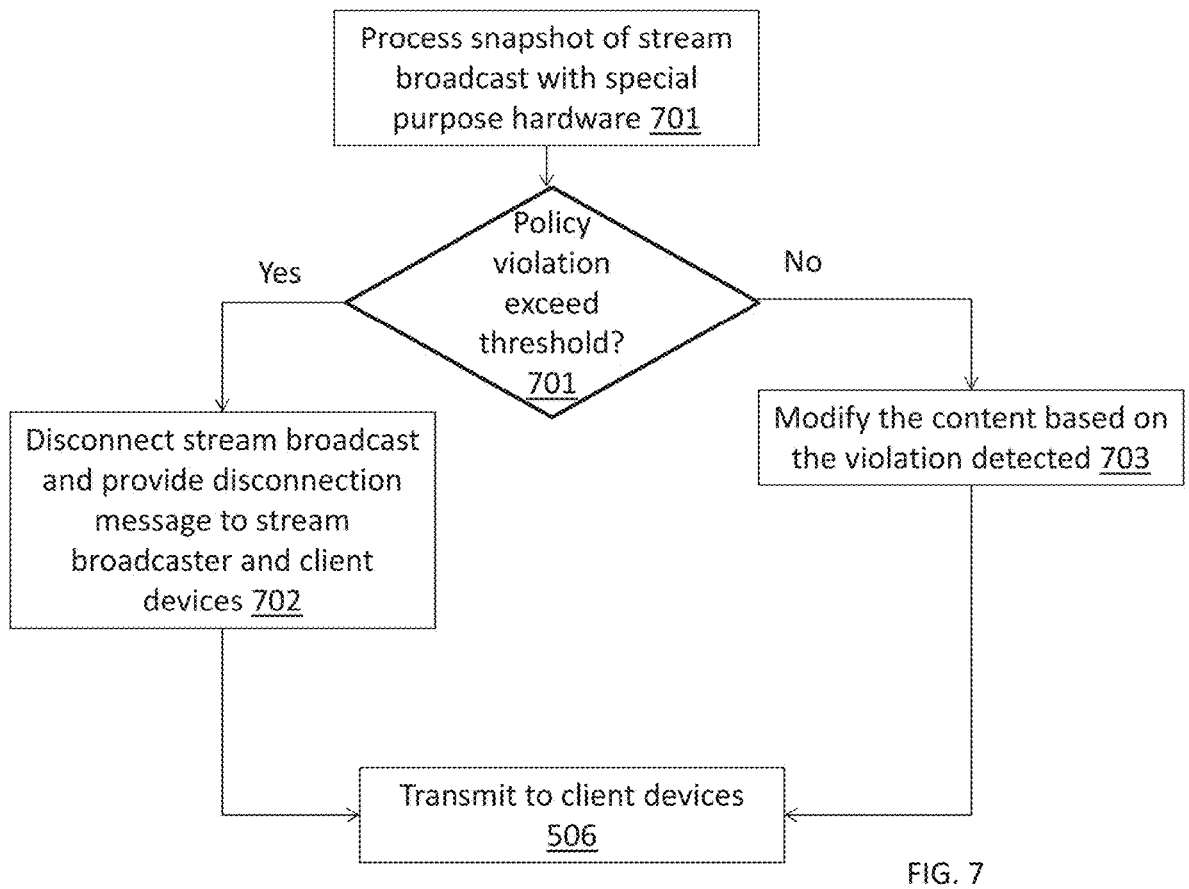
FIG. 7 illustrates a flow diagram, in accordance with an example implementation.

FIG. 7 illustrates a flow diagram, in accordance with an example implementation. Specifically, FIG. 7 illustrates an example flow for the processing of stream broadcasts in memory for inappropriate or other policy violating content at 503 to 504 of FIG. 5 through use of special purpose hardware processors for when a violation is detected.

At 701, a determination can be made if the policy violations have exceeded a desired threshold. For example, the threshold can be set for the stream has 20 to 30 seconds of policy violations, to specific types of policy violations detected, or other methods in accordance with the desired implementation. If so (Yes), then the flow can proceed to 702 whereupon the stream broadcast can be disconnected and a disconnection message can be provided to both the stream broadcaster and to the client devices. Depending on the desired implementation, a violation can be recorded against the broadcasting stream, whereupon if the number of violations exceed a threshold, the account and stream history can be flagged for review to determine if the account should be suspended. If not (no), then the flow can proceed to the flow at 703.

At 703, the special purpose hardware processors can be configured to modify the content based on the policy violation. In an example implementation, the special purpose hardware processors can drop the frames determined to have a policy violation. Depending on the desired implementation, if only a portion of the frame is in violation of the set policy, the section of each frame can be pixelated, or the entire frame can be pixelated depending on the desired implementation. If only the audio is in violation, then the audio portion of the stream broadcast can be removed or the quality of the audio can be reduced.

Depending on the desired implementation, the availability of the special purpose hardware processors and/or the number of stream broadcasts being processed by the cloud, the cloud can be configured to process all of the incoming stream broadcasts passively. If such resources are not available, in example implementations, the server or cloud can also be configured to apply the machine learning processing for inappropriate content only on flagged streams to save on processing, in accordance with the desired implementation. Streams can be flagged or not depending on scoring done initially based on machine learning algorithm processing. In such implementations, if the machine learning algorithm determines that no processing is needed (e.g., a score threshold is not met, etc.), then the broadcast is cached and then broadcast to the corresponding clients. In other example implementations, flagging can be triggered by the detection of keywords or audio phrases from the broadcast audio stream (e.g., via speech to text conversion) or chat text, from conducting character recognition such as Optical Character Recognition (OCR) to detect text or symbols that are considered to be inappropriate across a plurality of frames, from flagging indicated directly from client devices of audience members, and so on depending on the desired implementation. In an example involving text or symbol recognition such as OCR, individual frames are processed for text or symbols, and if the threshold of frames having inappropriate keywords or symbols is detected, then the stream can be flagged as having inappropriate content according to the example implementations.

In an example implementation, the processing of the stream broadcasts by the cloud can also be triggered through the client devices. For example, the user interface of the client devices as illustrated in FIGS. 6A and 6B may further be configured with a button for flagging a stream, whereupon the stream broadcasts can be triggered if the number of client devices flagging the stream reaches a certain threshold. The processing can also be triggered by the flagging of the stream reaching a threshold in combination with other factors (e.g., chat keywords, audio keywords, etc.) in accordance with the desired implementation.

Training of the Machine Learning Algorithm and Special Purpose Hardware Processors In example implementations, the machine learning algorithm can use a training set generated by human moderators. In many stream broadcasting implementations, human moderators maintain a database of policy violations for stream broadcasters utilizing the cloud service. As a cloud provider tends to have a large database of example violations that are classified into categories, such a database can be utilized for the training set of the machine learning algorithm to determine violations. FIG. 8 illustrates an example database of violations, in accordance with an example implementation. In this example, each violation is recorded by human moderators based on strikes placed against user accounts, and can include information such as the user ID, the policy strike (e.g., the type of policy violation incurred), the corroborating evidence from the stream broadcast (e.g., audio, pictures, video, chat log, etc.), and the appeal result or final resolution indicating if the policy violation was identified correctly or not. Such a database is fed into the machine learning algorithm to generate algorithms for one or more different policy violations. For example, machine learning algorithms use both positive and negative results as indicated by the database along with the corroborating evidence to learn the particular weights or neural networks for classifying according to a particular policy violation, and then can be trained further by reinforcement learning or other methods depending on the desired implementation.

Depending on the desired implementation, the corroborating evidence may also have areas that can be subject to feature extraction (e.g., highlighting the portion of the picture that is in violation, showing particular frames in the video as being in violation, etc.). In example implementations, the machine learning algorithms can extract features from the corroborating evidence (e.g., particular pixels, audio fingerprints, particular frames, keywords derived from speech to text algorithms, etc.) that can be used to train the classifiers for the particular type of policy violation. In such an example implementation, any feature extraction or image/audio recognition technique may be utilized along with any machine learning image or audio classifying technique in accordance with the desired implementation.

In other examples, the machine learning algorithm can create hashes from particular arrangements of pixels or audio samples of the corroborating evidence if a particular arrangement of pixels or a particular audio sample is known to always be in violation of policy. For example, if particular audio keywords or visual depictions are banned (e.g., swear words, reference to Nazis, depictions of swastikas or other hate symbols, etc.), then the audio or visual depictions can be learned by the machine learning algorithm as being in violation of policy. Audio keywords can be extracted using speech to text conversion, through comparing audio fingerprints, or through any other implementation in accordance with the desired implementation. Visual depictions can be detected using image feature extraction techniques, through comparing the hashes of portions of images, or through any other implementation in accordance with a desired implementation.

In addition to the utilization of already moderated content as illustrated in FIG. 8, example implementations may also utilize databases having examples of policy violating content in accordance with a desired implementation. For example, a copyright or trademark database can be utilized having known examples of copyrighted or trademarked content (videos, pictures, audio) that can be processed for recognition. Similarly, for pornography or nudity, a database can also be utilized having known examples of such content that can be processed for recognition. Such databases can be constructed for any types of content considered to be in violation of policy (e.g., hate speech, hate symbols, child pornography or other illicit content, restreaming of live sports matches, etc.) in accordance with the desired implementation.

In an example implementation that the machine learning algorithm can be implemented, a scoring mechanism can be provided with weights. An example scoring mechanism can be:

$$Policy\_violation\_score = w1(video\_frame\_score) + w2(audio\_score) + w3(chat\_score) + w4(other\_score)$$

Wherein video_frame_score is a function generated by the machine learning algorithm for processing and scoring the video frame, audio_score is a function generated for processing and scoring the audio, chat_score is a function generated for processing and scoring the chat log, and other_score is a function and scoring other criteria in accordance with the desired implementation (e.g., number of times stream is flagged by users, number of users that have flagged the stream, country stream of origin, number of policy violations associated with the stream broadcaster account, scoring based on keywords used in title or search tags, etc.). w1, w2, w3, and w4 are weights for the policy violation scoring that can be set initially, and/or can be adjusted by the machine learning algorithm according to the desired implementation. For example, if the video frames are essentially static (e.g., just a landing screen or just one person talking in a room), then the weight w1 for the video_frame_score can be reduced, wherein the other weights can be increased. Similarly, if there is no audio or no chat, then the audio and chat weights can be reduced whereas the other weights can be increased. Such weights can be adjusted according to any desired implementation.

In example implementations, reinforcement learning or deep learning can also be applied to train the machine learning algorithm. In such example implementations, based on the database of inappropriate content, the machine learning algorithms generates its own training set to expand the training set used for conducting the machine learning algorithm.

Example implementations described herein are directed to live or streaming broadcasts, however, such implementations may also be applied to video publishing systems on websites as well. In such example implementations, uploaded video that is then published live for public access can be processed in the background by the special purpose hardware processors, whereupon the published video can be modified similarly to the examples provided herein.

In the example implementations described above, because the published video content can be deprecated or modified during processing time before the video is published and does not have to be completely removed, the published video can still be made viewable in case if the video is improperly flagged or improperly determined to be a violation of policy, thereby addressing the related art problem of costing the content viewer the views when a video is improperly flagged as being in violation of policy.

Finally, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

The invention claimed is:

1. A method, comprising:
buffering a live stream broadcast in a cloud system;
processing, in the cloud system, the buffered live stream broadcast with one or more special purpose hardware processors configured with a machine learning algorithm for detecting a policy violation;
for the processing indicative of the policy violation existing in the buffered live stream broadcast, causing the buffered live stream broadcast to be modified;
wherein transmission of the live stream broadcast is continued while causing the buffered live stream broadcast to be modified, wherein a portion of the transmission of the live stream broadcast corresponding to the modified buffered live stream broadcast is modified;
wherein, for the causing the buffered live stream broadcast to be modifite exceeding a threshold period of time;
ending the processing on the buffered live stream;
transmitting the buffered live stream without modificaion to client devices; and
flagging the buffered live stream for review.

2. The method of claim 1, wherein the buffering the live stream is conducted on flash memory configured to function as cache for the cloud system, wherein the processing is conducted on the buffered live stream on the flash memory.

3. The method of claim 1, wherein the one or more special purpose hardware processors comprises at least one of graphical processing units (GPGPUs), tensor units and streaming processors.

4. The method of claim 1, wherein the causing the buffered live stream broadcast to be modified comprises at least one of:
transmitting the buffered live stream broadcast at a lower resolution; and
instructing client devices receiving the buffered live stream broadcast to display the buffered live stream at the lower resolution.

5. The method of claim 1, wherein the causing the buffered live stream broadcast to be modified comprises causing client devices to display a buffering or loading indicator.

6. The method of claim 1, wherein the causing the buffered live stream broadcast to be modified comprises causing client devices to disconnect from the live stream broadcast.

7. The method of claim 1, wherein the causing the buffered live stream broadcast to be modified comprises causing client devices to reduce the resolution of the buffered live stream broadcast.

8. The method of claim 1, wherein the processing the buffered live stream broadcast with the one or more special purpose hardware processors is conducted in response to a number of content flagging from client devices exceeding a threshold.

9. The method of claim 1, wherein the processing the buffered live stream broadcast with the one or more special purpose hardware processors further comprises processing a chat log associated with the buffered live stream broadcast with the one or more special purpose hardware processors;
wherein the processing is determined to be indicative of the policy violation existing in the buffered live stream broadcast based on content in the buffered live stream broadcast and the chat log.

10. The method of claim 1, wherein for a number of policy violations of a stream broadcasting account associated with the live stream broadcast exceeding a threshold, disconnecting the live stream broadcast and conducting at least one of:
flagging the stream broadcasting account for review; and
suspending the stream broadcasting account from broadcasting live stream broadcasts.

11. The method of claim 1, wherein the policy violation comprises age inappropriate content, wherein the machine learning algorithm is trained from a database of age inappropriate content.

12. The method of claim 1, wherein the policy violation comprises nudity, wherein the machine learning algorithm is trained from a database of nudity.

13. The method of claim 1, wherein the policy violation comprises hate speech violation, wherein the machine learning algorithm is trained from a database of hate speech violations.

14. The method of claim 1, wherein the machine learning algorithm is trained against a database of content flagged for one or more types of policy violations.

15. The method of claim 1, wherein the causing the live stream broadcast to be modified comprises demonetizing the live stream broadcast.

16. The method of claim 1, wherein the causing the live stream broadcast to be modified comprises restricting user access to the live stream broadcast.

17. The method of claim 1, wherein the causing the live stream broadcast to be modified comprises changing searchability of the live stream broadcast.

18. The method of claim 1, wherein the processing comprises conducting optical character recognition on a plurality of frames of the live stream.

* * * * *